United States Patent [19]

Briggs et al.

[11] Patent Number: 5,125,849

[45] Date of Patent: Jun. 30, 1992

[54] CONNECTOR GUIDE MEANS

[75] Inventors: Robert C. Briggs, Newport; Steven P. Owens, Grantville; Wallace R. Savitsky; David D. Sonner, both of Harrisburg, all of Pa.

[73] Assignee: AMP Incorporated, Harrisburg, Pa.

[21] Appl. No.: 549,789

[22] Filed: Jul. 9, 1990

[51] Int. Cl.⁵ .................. H01R 13/645; H01R 13/629
[52] U.S. Cl. ..................................... 439/378; 439/681
[58] Field of Search ................. 439/64, 374, 378–381, 439/247, 248, 377, 571, 573, 681

[56] References Cited

U.S. PATENT DOCUMENTS

| 2,820,209 | 1/1958 | Whitted | 439/571 |
| 4,159,862 | 7/1979 | Funck et al. | 439/681 |
| 4,211,917 | 7/1980 | Hofmann | 439/681 |
| 4,647,130 | 6/1986 | Blair et al. | 339/64 M |
| 4,664,462 | 5/1987 | Owens | 439/378 |
| 4,761,144 | 12/1986 | Hunt, III et al. | 439/545 |
| 4,790,763 | 9/1986 | Weber et al. | 439/65 |
| 4,797,123 | 3/1988 | Weber | 439/717 |
| 4,808,115 | 7/1988 | Norton et al. | 439/79 |
| 4,929,194 | 5/1990 | Korsunsky et al. | 439/571 |

FOREIGN PATENT DOCUMENTS

| 33286 | 8/1981 | European Pat. Off. | 439/681 |
| 2058922 | 6/1972 | Fed. Rep. of Germany | 439/571 |
| 1359825 | 12/1987 | U.S.S.R. | 439/378 |

OTHER PUBLICATIONS

IBM Technical Disclosure Bulletin, "Connection Alignment Pin with Selectable Key", vol. 15, No. 2, pp. 624, Jul. 1972.

Primary Examiner—Gary F. Paumen
Attorney, Agent, or Firm—Gerald K. Kita

[57] ABSTRACT

A connector guide (30) includes an apertured body (31) adapted to receive a guide pin (26) to position, align, and/or polarize mating connectors (14, 22). The guide embodiments include projections (32, 34, 36, 56) adapted to lock guide means to connector mating structures such as a printed circuit board (12) or a cover (23).

7 Claims, 4 Drawing Sheets

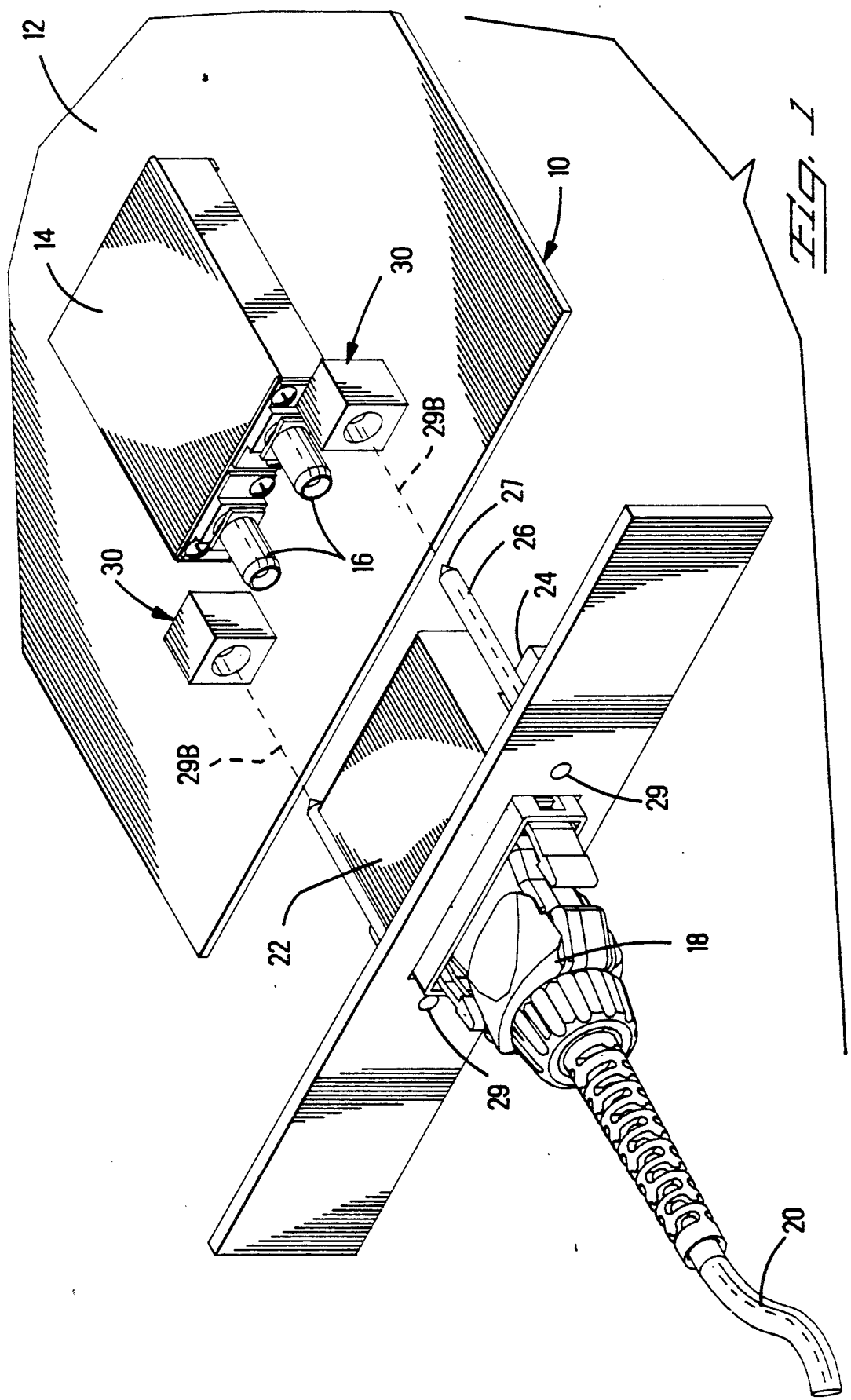

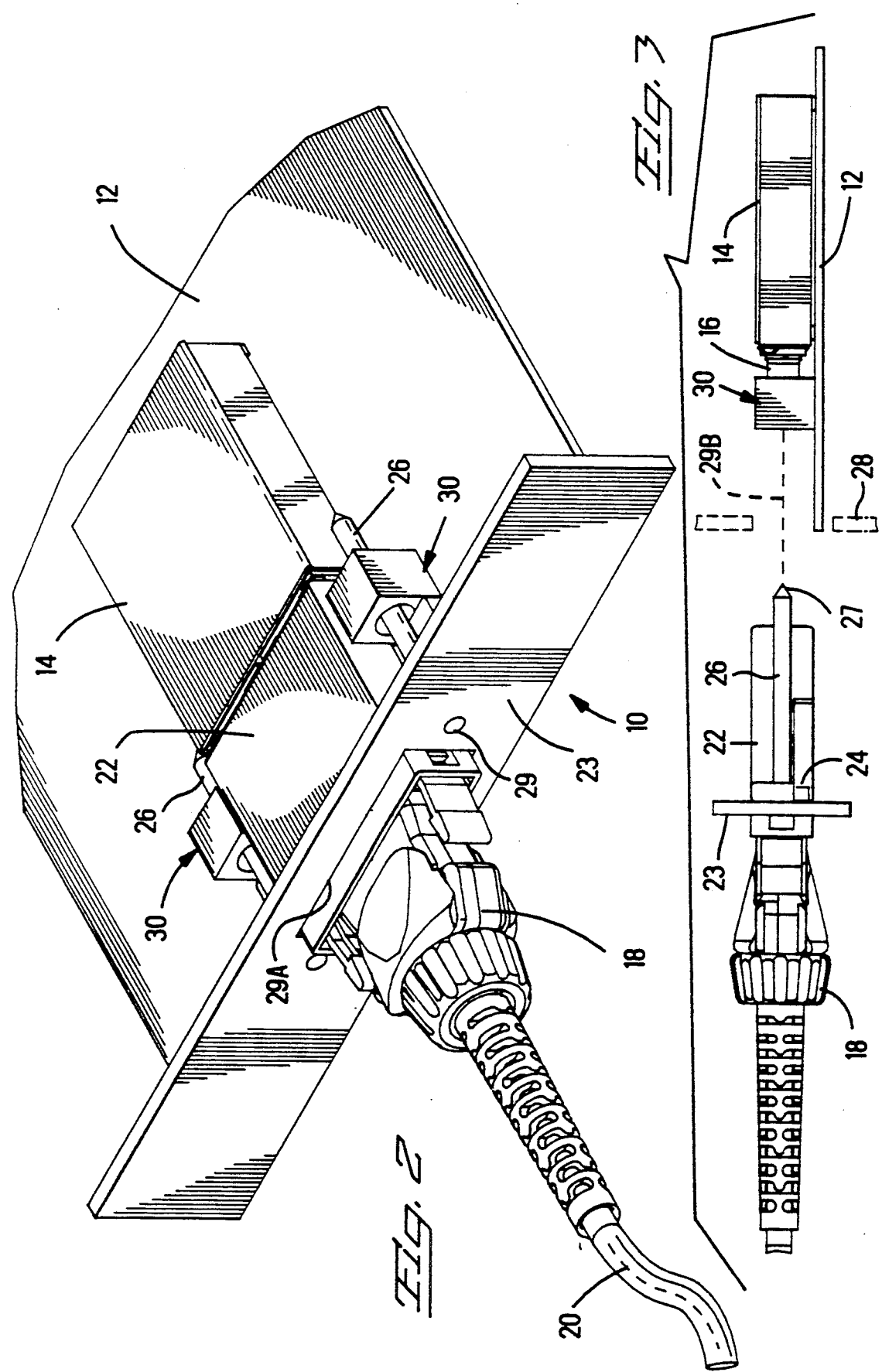

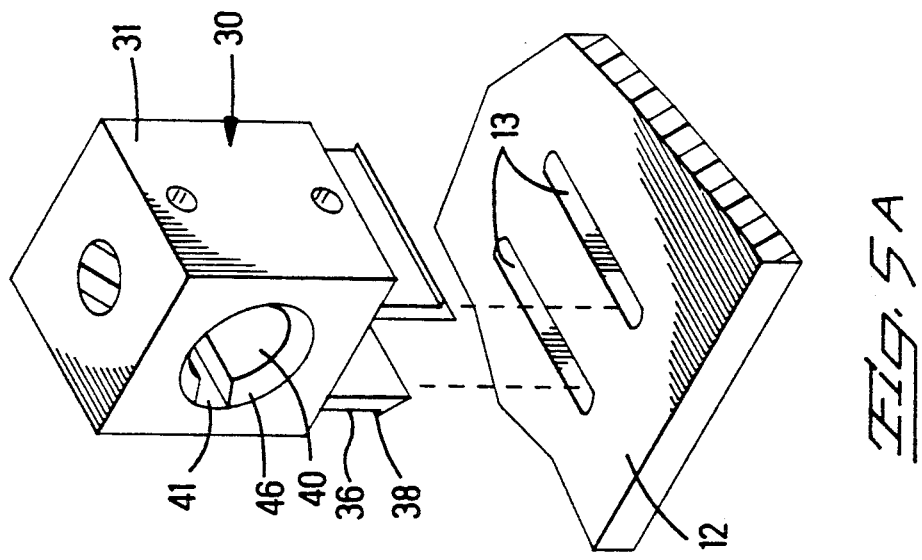
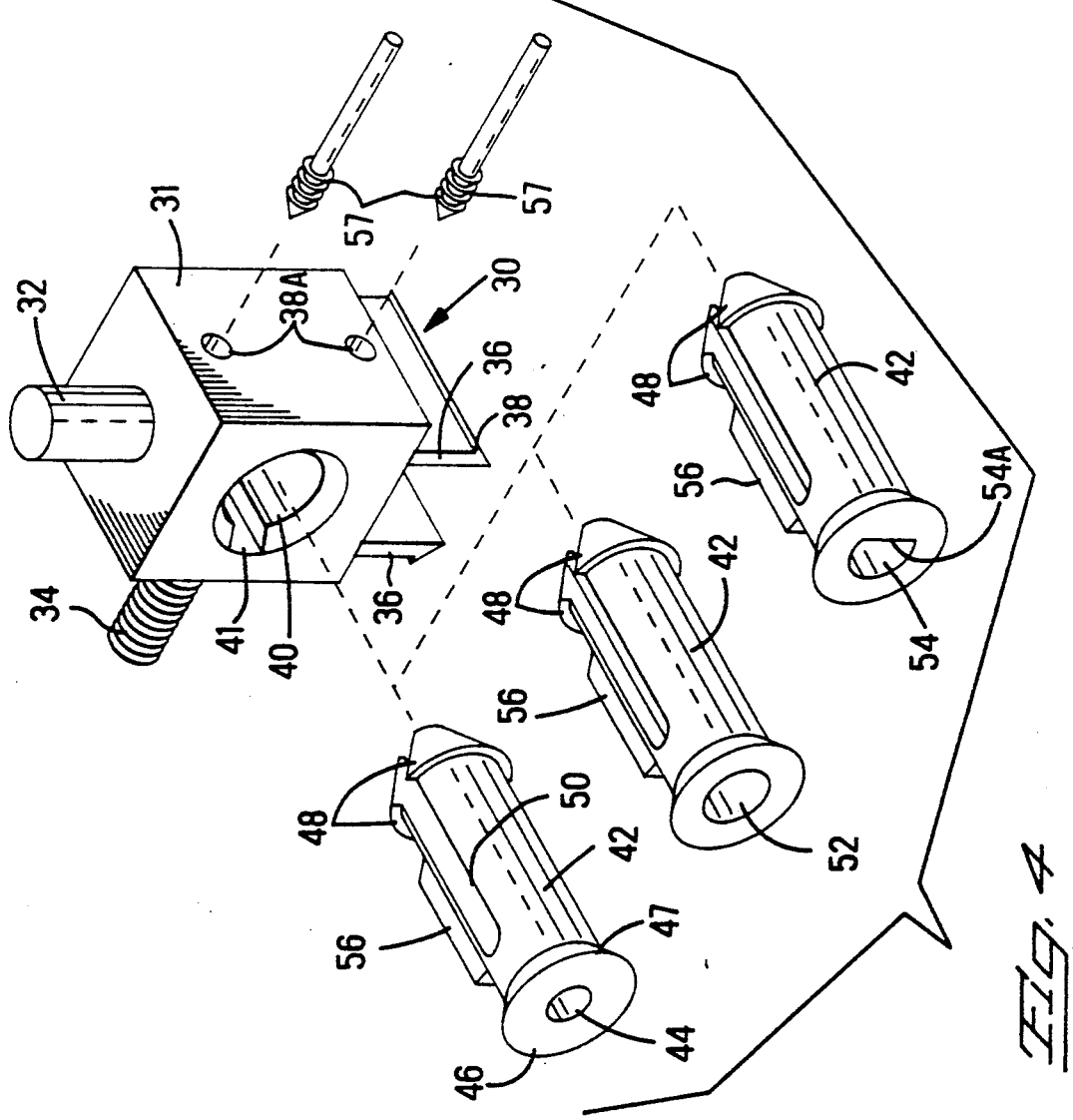

CONNECTOR GUIDE MEANS

This invention relates to a guide means for positioning, aligning, and guiding mating electrical or optical connector halves together.

BACKGROUND OF THE INVENTION

It is standard practice with respect to mating connectors to provide means which position the connector halves so that the terminals therein are aligned for a proper mating engagement. It is common to provide pins, posts, and projections in one half made to fit within complementary apertures in the other half; both integrally molded with respect to the housings of the connector halves, or added as hardware. As a general rule, the features on connectors halves intended to assure proper mating work with respect to the connectors themselves and not with respect to mounting structures such as printed circuit boards or the like. This circumstance can create problems particularly wherein the two halves of connectors may come from different sources or may be utilized at different times in different ways with respect to fundamentally different packaging geometries.

It is an object of the present invention to provide a universal guide means which can be separately mounted to be freestanding on mounting structures to facilitate positioning and guiding for alignment the mating engagement of connector halves. It is a further object to provide a guide means facilitating mounting of a connector half on a mounting structure such as a printed circuit board in a simple and novel manner. It is final object to provide an improved guide means for intermating electrical and optical connectors to join cables to circuit boards.

SUMMARY OF THE INVENTION

The present invention utilizes a guide means in the form of a housing body preferably molded of engineering plastic to include a central aperture made to receive a pin with the aperture and pin beveled in a complementary fashion intended to align the pin upon insertion within the aperture and with the pin and body affixed to mounting structures carrying the connector halves. The invention body includes in a series of embodiments one or more projections which fit through apertures in a mounting structure such as a printed circuit board and lock the body thereto. The complementary pin structure is mounted to either the mating half of a connector or to the mounting structure carrying such mating half and is made of a dimension so that structural alignment occurs first and with that alignment, alignment of the connectors to be mated. In one embodiment the guide means is made to include a plurality of projections which can be selectively used to adapt the means to a variety of mounting practices. In a further embodiment, the guide means includes a snap-in liner which can be rendered with apertures of different geometries to mate with pins of complementary different geometries to provide polarization and selectivity as between the mating of connector halves.

IN THE DRAWINGS

FIG. 1 is a perspective showing connector halves preparatory to mating along with associated mounting structures.

FIG. 2 is a view of the structure shown in FIG. 1 following mating.

FIG. 3 is an elevational side view of the connector halves as mated in FIG. 2.

FIG. 4 is a perspective, enlarged from actual size, showing the invention in one embodiment with aperture liners exploded therefrom.

FIGS. 5A-5D are perspectives of different embodiments of the invention, much enlarged, positioned preparatory to insertion in a mounting structure.

DETAILED DESCRIPTION OF THE INVENTION

Figure 5D:
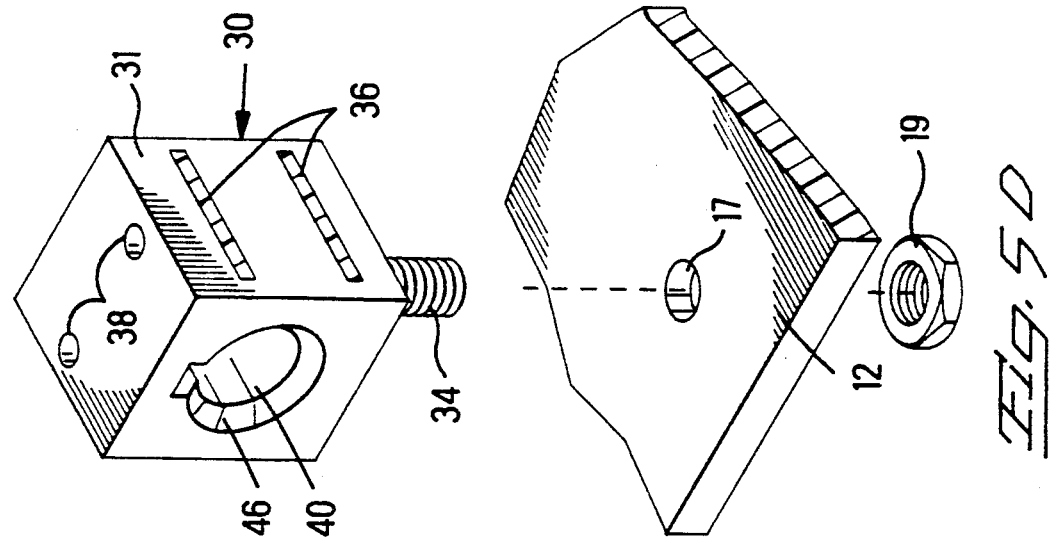

Referring now to FIG. 1, an electronic package 10 is shown to include a mounting structure 12 which may be a printed circuit board carrying circuit traces to electronic components such as logic and memory devices. Mounted on 12 is a connector half 14 which includes a pair of signal ports 16 suitably interconnected in the case of optical devices to components which convert optical to electrical signals and electrical to optical signals. In the case of electrical connectors, the ports 16 would connect electrical signals to the circuits of 12.

FIG. 1 also shows a further connector half 18 terminating a cable 20 to a forward portion 22. A pair of complementary ports interconnect with the ports 16 upon mating of the connector halves. A connector half 18 is mounted as indicated in a mounting structure 23 which may be considered in the embodiment here involved as a panel front which encloses the interconnection when the connector halves are mated, note the facade 28 shown in phantom in FIG. 3 through which connector half 18 is fitted and against which cover 23 will bear. Also as shown in FIG. 3, the connector 18 includes a mounting structure 24 which may be considered to be integral with cover 23 or part of the connector half. The structure 24 supports part of a guide means in the form of a post or pin 26 beveled as at 27 and fitted through cover 23 as at 29. The presence of 26 aligns the cover 23 with the mounting structure 12 and as well with the connector 18 fitted through an aperture 29A in cover 23. FIGS. 1 and 3 show alignment axes 29B. extending from pins 26 through a guide 30 mounted to 12. To be noted from FIGS. 1 through 3 is that guides 30 are mounted independently of the connector half 14. In the figures shown, a pair of guides 30 are employed, it being understood that dependent upon the configuration of the mating connector halves, different numbers of guide means may be employed and that insofar as possible, considering the design of the mounting means 12 in terms of its external/internal circuits, the guides 30 may be mounted at the edges, interiorly on 12 without other essential restriction.

FIG. 4 shows a composite mounting guide 30 which includes a main body 31 preferably molded of engineering plastic material to include the detail shown. It is to be understood that the body 31 can be molded with mold gates stopped off to selectively provide any one of a number of features or may be molded as shown with the various projections selectively sheared away; all dependent upon the projected parts volume for the several embodiments. It is also to be understood that the various embodiments may be molded in separate multicavity molds carrying only a particular feature as a factor of mold utilization. Referring again to FIG. 4, the body 31 may be seen to have a round projection 32 extending from the upper surface thereof, a threaded projection 34 extending from one side thereof, and a pair of flexible latches 36 tapered as at 38 extending from the bottom thereof. Additionally, body 31 has a pair of apertures 38A intended to receive metal posts 57 with enlarged barbs to lock into the material of the housing when forced into the apertures 38.

Interiorly and central to the body 31 is a counter bored aperture 40 carrying along the side thereof a groove 41 intended to align a version of a liner plugged therein. The liner shown as 42, also molded of plastic, includes a central aperture 44, a beveled flange 46 having lip 47, and tapered lances 48 which are deformed inwardly by the provision of a slit 50 as 42 is positioned within 40. The three liners shown further include one having an aperture 52 considerably larger than aperture 44 and a liner having an aperture 54 partially filled with plastic to provide projecting inner wall 54A for orientation for a similarly shaped mating pin. The liner providing orientation also includes a projection 56 intended to fit within the groove 41 of body 31. It is contemplated that liners such as those shown and if necessary, liners of other geometries, may be employed to particularize the use of a given guide 30. It is also to be mentioned that the invention contemplates molding in the apertures 44, 52, 54 directly, eliminating groove 41 and any separate liner should the volume of production of a particular geometry so dictate.

Figure 5C:
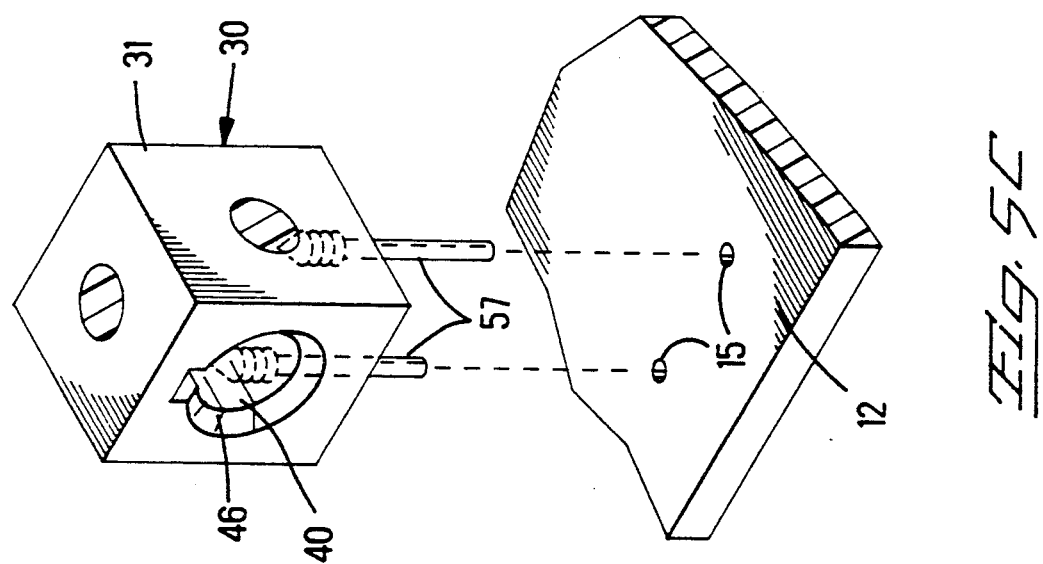
Figure 5B:
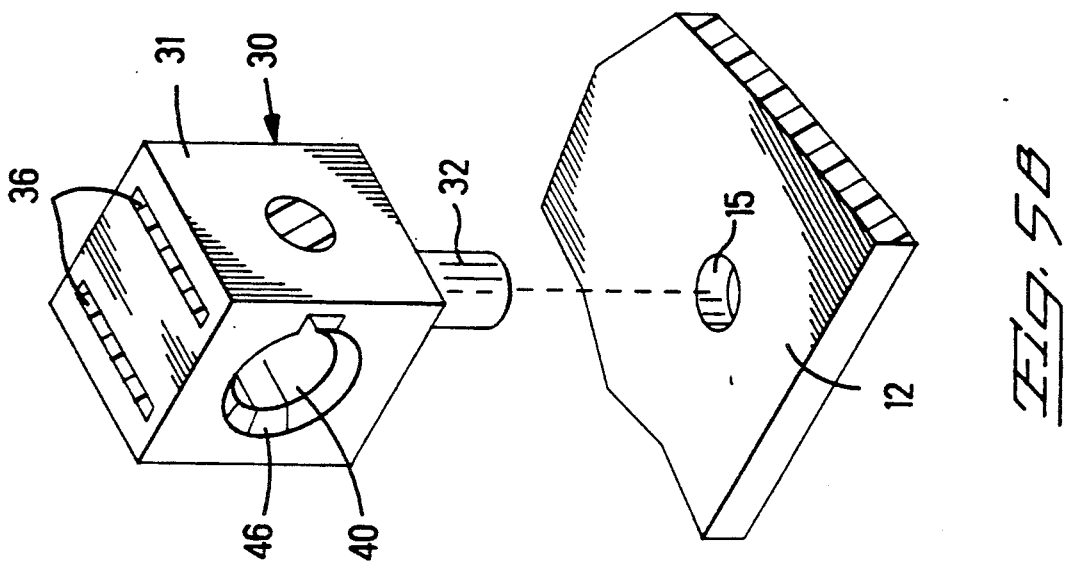

Referring now to FIG. 5A–D, embodiments of the invention guide 30 are shown particularized to the different versions of fastening means. Thus, in FIG. 5A a guide 30 is depicted with the body 31 oriented so that latching fastener legs 36 are aligned with apertures 13 in a board 12 for insertion therein. This embodiment of the guide 30 includes a version having an aperture liner therein. FIG. 5B shows a version of 30 having the post 32 projecting from a surface of 31 opposite latches 36 positioned preparatory to insertion in an aperture 15 in a board 12. In the version of 5A, the guide 30 would be utilized with a board, having components mounted thereon, the latches 36 fastening and positioning the guide 30 in the board. With respect to the guide 30 in FIG. 5B, the post 32 would preferably be heat staked so that the end thereof is flowed to lock the guide within the board 12.

In FIG. 5C, a version of the guide 30 is shown utilizing posts 57 aligned with apertures 15 in a board 12. In use, the version of the guide in FIG. 5C would be placed in position with the post 56 projecting through the holes 15 to be soldered in place along with other components on board 12, thus fastening the guide in place. In FIG. 5D, the guide 30 includes a molded threaded bolt 34 aligned to be extended through hole 17 in the board 12 and fastened thereto by a nut 49. The guide embodiments shown in FIG. 5B and in FIG. 5D represent versions wherein the apertures 40 are molded directly into the body 31 of the guides and contain no special liner.

The invention has been described in preferred modes with terms such as aperture, pin, post, liner, and latch; and terms such as plug and receptacle and connector halves. The invention contemplates a reversal of these elements in position to achieve the identical functions attributed thereto where function dictates. Thus, the pins labeled 26 may be placed on a board such as 12 with the guides 30 placed on, or proximate to, the covers 23. Thus too, connector halves in receptacle form may be cable connected with connector halves which are plug formed may be placed on the boards 12. The pins shown are in a preferred embodiment made of machined or cast metal with the guides made of plastic. Thereto it is contemplated that the guides may be made of metal suitably cast with the liners made of plastic; excepting for the latch version 36 which requires resilience.

Having now described the invention intended to enable its preferred practice in preferred modes, we now define it through the appended claims.

We claim:

1. Guide means for guiding into mating engagement a first connector half and a second connector half, the first connector half being attached to a first mounting structure such as a circuit board and the second connector half being attached to a second mounting structure, said guide means comprising:
   at least one pin, said pin being affixed at one end to the second mounting structure, and extending forwardly of said second connector half, and being beveled at a second end;
   at least one said body, one said pin corresponding to one body, said body being mounted on the circuit board and adapted to be attached to said board adjacent said first connector half, said body having a beveled aperture therein to receive the pin and to guide said pin into said body aperture by said beveling, said guide means adapted to guide said first and second connector halves into mating engagement through entry of said pin into said body aperture, and
   wherein there are multiple projections on said guide means body, each projection adapted to be sheared selectively to provide a body with a single projection adapted to be used with said guide means.

2. A guide means of claim 1 wherein the guide means body has a projection, said projection having at least one post projecting from said body, and said circuit board having at least one aperture adapted to receive said post with means for affixing said post to said board and thereby affixing said body to said board to precisely position the mating of said connector halves relative to said board.

3. The guide means of claim 2 wherein said projection is comprised of at least one metal post affixed to said body.

4. The guide means of claim 2 wherein said projection is integral with and formed of the material of said body.

5. The guide means of claim 2 wherein said projection is integral with said body and has characteristics to be heat staked to said board to lock said body to said board.

6. The guide means of claim 2 wherein said projection is threaded and adapted to be extended through said board and fastened thereto by a nut threaded thereon.

7. The guide means of claim 1 wherein the guide means body has a projection, said projection having a pair of flexible latch elements adapted to be latched to said board to lock said body to said board.

* * * * *